United States Patent
Huang et al.

(10) Patent No.: US 7,774,629 B2
(45) Date of Patent: Aug. 10, 2010

(54) METHOD FOR POWER MANAGEMENT OF CENTRAL PROCESSING UNIT AND SYSTEM THEREOF

(75) Inventors: Wen-Juin Huang, Hsin-Tien (TW); Chung-Chin Huang, Hsin-Tien (TW); Cheng-Wei Huang, Hsin-Tien (TW); Jui-Ming Wei, Hsin-Tien (TW)

(73) Assignee: Via Technologies, Inc., Taipei (TW)

( * ) Notice: Subject to any disclaimer, the term of this patent is extended or adjusted under 35 U.S.C. 154(b) by 822 days.

(21) Appl. No.: 11/604,814

(22) Filed: Nov. 28, 2006

(65) Prior Publication Data
US 2007/0204180 A1 Aug. 30, 2007

(30) Foreign Application Priority Data
Feb. 24, 2006 (TW) .............. 95106339 A

(51) Int. Cl.
G06F 1/26 (2006.01)
G06F 1/32 (2006.01)
G06F 13/00 (2006.01)

(52) U.S. Cl. .............. 713/320; 713/300; 713/323; 711/3; 711/101

(58) Field of Classification Search .............. 713/300, 713/320, 323; 711/3, 101
See application file for complete search history.

(56) References Cited

U.S. PATENT DOCUMENTS

| 5,894,562 | A | * | 4/1999 | Moyer | 710/113 |
| 6,016,548 | A | * | 1/2000 | Nakamura et al. | 713/323 |
| 6,125,450 | A | * | 9/2000 | Kardach | 713/323 |
| 6,360,327 | B1 | * | 3/2002 | Hobson | 713/300 |
| 2003/0065914 | A1 | * | 4/2003 | Saw-Chu et al. | 713/1 |
| 2005/0060591 | A1 | * | 3/2005 | Yoshiyama et al. | 713/320 |
| 2006/0053310 | A1 | * | 3/2006 | Su et al. | 713/300 |
| 2006/0294404 | A1 | * | 12/2006 | Ho | 713/300 |

* cited by examiner

Primary Examiner—Vincent T Tran
(74) Attorney, Agent, or Firm—Thomas, Kayden, Horstemeyer & Risley, LLP

(57) ABSTRACT

A method for power management of a CPU and a system thereof, which drive the CPU to enter a more efficient power saving state are disclosed. A chip of the present invention sends a first control signal to drive the CPU to wake from a non-snooping sleep state and enter a normally executing instruction state as well as a system management mode to execute a system management interrupt routine. Then the chip enables an arbiter to transmit a bus master request to the CPU for processing. After completing the processing of the bus master request, the chip disables the arbiter and the CPU drives the chip to send a second control signal to drive the CPU to return to the non-snooping sleep state according the system management interrupt routine.

20 Claims, 3 Drawing Sheets

METHOD FOR POWER MANAGEMENT OF CENTRAL PROCESSING UNIT AND SYSTEM THEREOF

FIELD OF THE INVENTION

The present invention relates to a method for power management of central processing unit (CPU) and a system thereof, and more particularly to a method for power management of CPU and a system thereof which drive the CPU to enter a most efficient power saving state in due course.

BACKGROUND OF THE INVENTION

Accompanying the progression of computer technology, computer systems are being provided with increasingly have powerful and robust functions. Presently, computer systems further provide multimedia service for entertainment besides processing paperwork. Corresponding to the powerful functions of computer systems, the speed and performance of CPUs are dramatically advanced, which results in increasing power consumption of CPU. Accordingly, the power management of CPU is an important problem for conventional computer systems, especially for portable computers, which are powered from batteries, for the great power consumption reduces the power supplying time of the batteries, which results in a correspondingly limited operational time of the portable computer.

In order to enhance power usage efficiency of computer systems, most power management systems are based on Advanced Power Management (APM) and Advanced Configuration and Power Interface (ACPI) in recent years, wherein the ACPI carrying on the power management through the operating system has better efficiency. The power management states defined by the ACPI include: Global state (G state), Sleep state (S state), Device state (D state) and CPU state (C state).

FIG. 1 is a schematic drawing showing CPU state of the conventional ACPI. As show in FIG. 1, the CPU state of the ACPI includes C0 state, C1 state, C2 state and C3 state. The CPU executes instructions normally at the C0 state, while the C1, C2, and C3 states are different levels of low power sleep states for the CPU. According to the usage of the CPU, the operating system drives the CPU to enter the different levels of sleep states for reducing power consumption.

With reference to the states described above, the C3 state, a non-snooping sleep state, is a state in which the CPU does not process any event. Therefore, when a peripheral device connected with a computer system sends an interrupt event or a bus master request to the computer system, while the CPU is at the C3 state, the CPU is driven to wake from the C3 state and return to the C0 state for processing the interrupt event or the bus master request. After that, the operating system will not drive the CPU return to the C3 state until the usage of the CPU satisfies the conditions for entering C3 state.

The peripheral device sends the bus master request for the accessing the system memory. However, the CPU has to wake from the C3 state and enter the C0 state to process the bus master request, and it takes the CPU a period of time to satisfy the conditions of entering C3 state and return to the C3 state. Thus, additional power is consumed during the time that the CPU is at C0 state waiting to return to the C3 state. As a result, additional time is lost before the CPU can reenter the most efficient power saving state. As described above, this results in excessive power consumption, and a corresponding reduction in the usage time of the portable computers.

SUMMARY OF THE INVENTION

A method for power management of CPU and a system thereof are provided.

An embodiment of a method for power management of CPU is in a non-snooping sleep state while a peripheral device sends a bus master request. A first control signal and a system management interrupt signal are sent to the CPU for driving the CPU to wake from the non-snooping sleep state and to enter a normally executing instruction state as well as a system management mode. An arbiter is enabled to transmit the bus master request to the CPU for processing. After the bus master request is processed by the CPU, the arbiter is disabled, and a second control signal is send to the CPU for driving the CPU to return to the non-snooping sleep state according to the system management interrupt routine.

In an embodiment of a power management system for a CPU at a non-snooping sleep state, wherein the system is electronically connected with a peripheral device which sends a bus master request. And the system includes a chip, for sending a first control signal and a system management interrupt signal to the CPU for driving the CPU to wake from the non-snooping sleep state and to enter a normally executing instruction state as well as a system management mode; an arbiter, for transmitting the bus master request to the CPU; and a memory, for storing a system management interrupt routine executed by the CPU. When the CPU enters the normally executing instruction state, the chip enables the arbiter for transmitting the bus master request to the CPU for processing, and after the CPU completes processing the bus master request, the chip disables the arbiter and sends a second control signal to the CPU for driving the CPU return to the non-snooping sleep state according to the system management interrupt routine.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION

Figure 1:
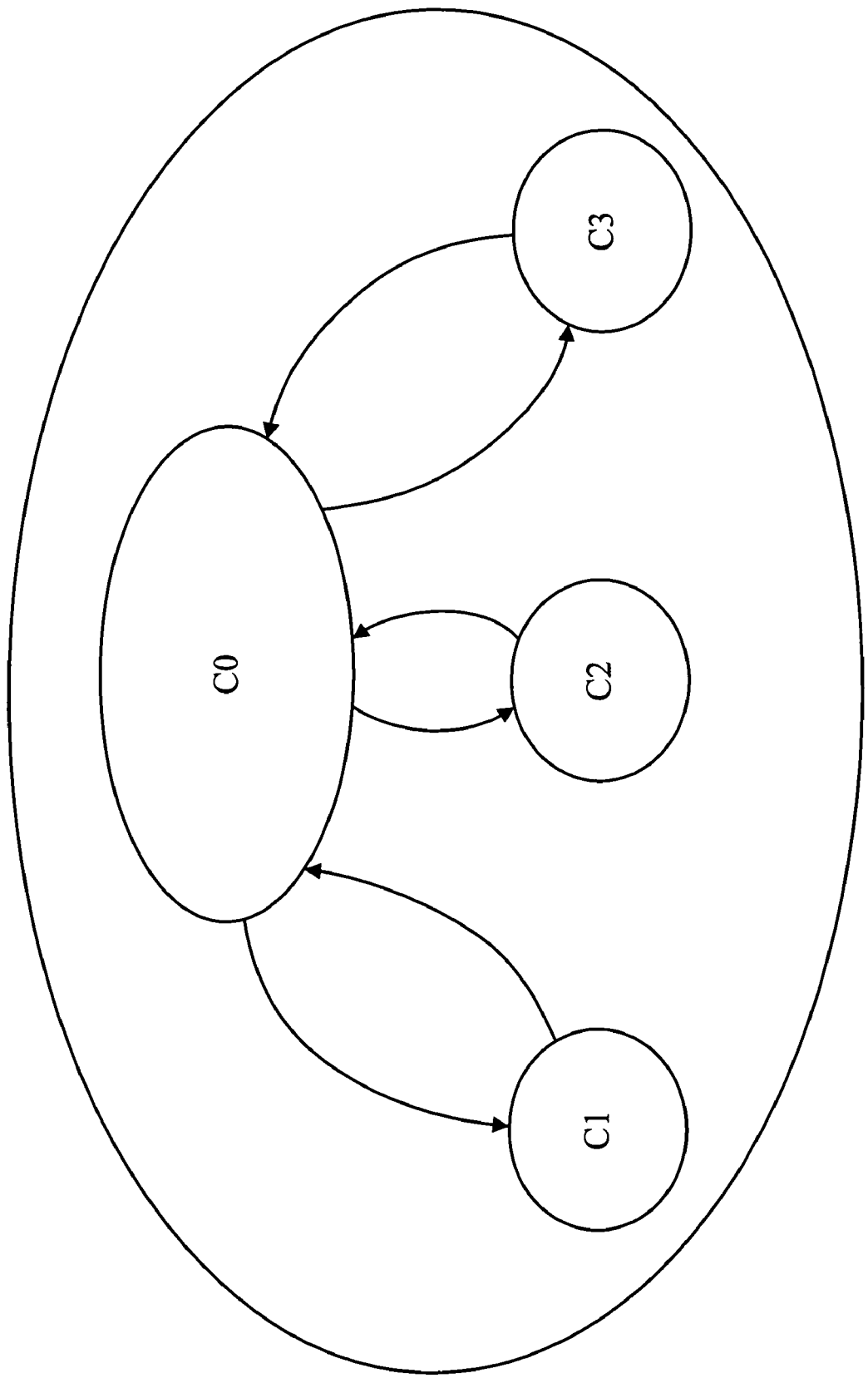
FIG. 1 is a schematic drawing showing CPU states of the conventional ACPI processors.
Figure 2:
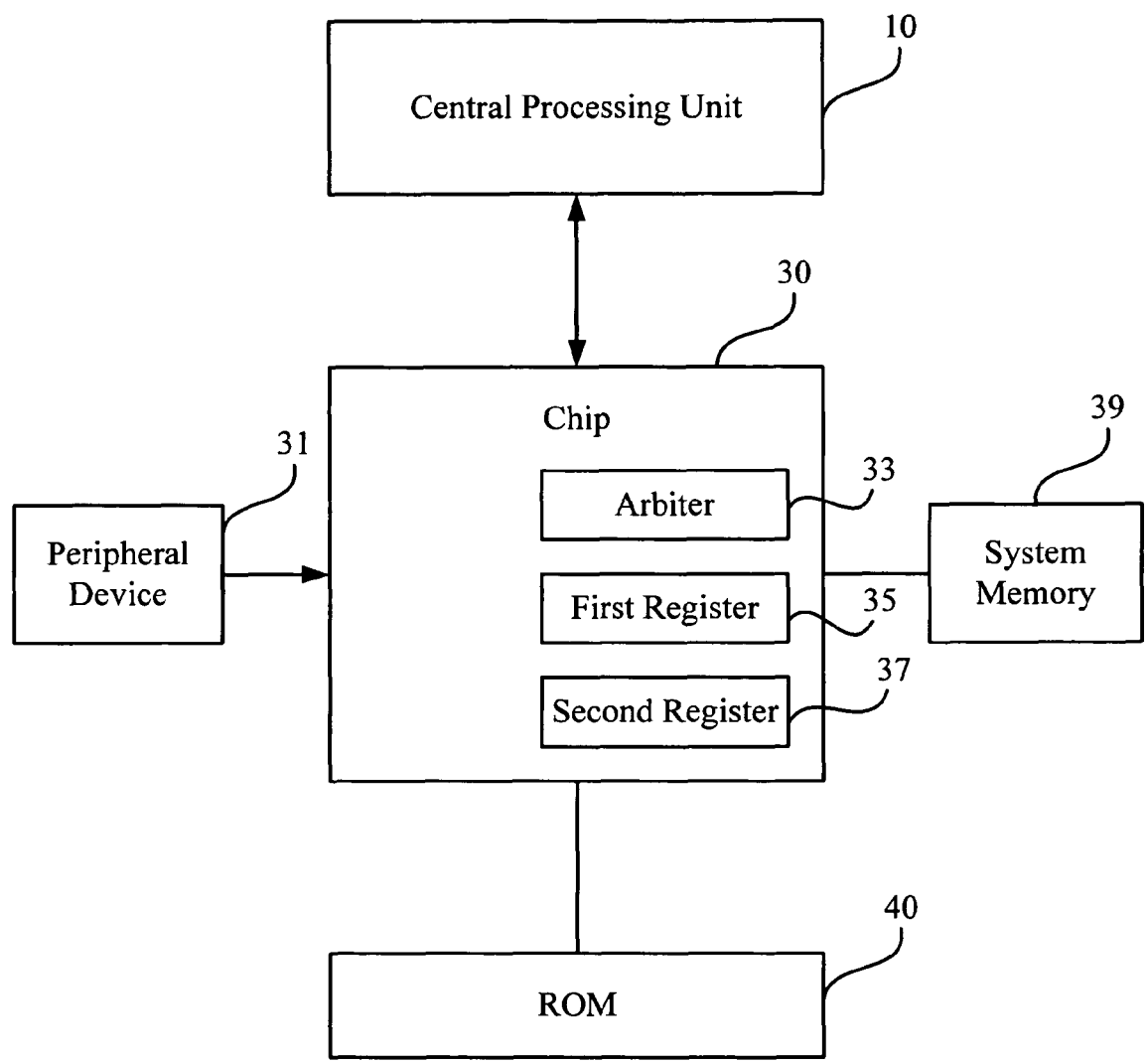
FIG. 2 is a block diagram showing the power management system according to an embodiment of the present invention.

Reference is made to FIG. 2, which illustrates a block diagram showing a power management system according to an embodiment of the present invention. The system includes a central processing unit (CPU) 10, a chip 30 and a system memory 39. The chip 30 couples to the CPU 10 as well as the system memory 39 respectively for switching information. Moreover, the chip 30 is connected with a read only memory (ROM) 40 and a peripheral device 31, and the chip 30 includes an arbiter 33, a first register 35 and a second register 37. A system management interrupt routine is stored in the ROM 40. Wherein the first register 35 and the second register 37 could be disposed external to the chip 30, as well as on the chip 30.

Before the CPU 10 enters the non-snooping C3 state, the chip 30 disables the arbiter 33 to prevent the arbiter 33 transmitting any event to the CPU 10. Thus no event from the peripheral device 31 is sent to the CPU 10 through the arbiter 33 of the chip 30 after the CPU 10 enters the C3 state. Therefore, when in the C3 state, the CPU 10 is in a non-snooping sleep state.

Figure 3:
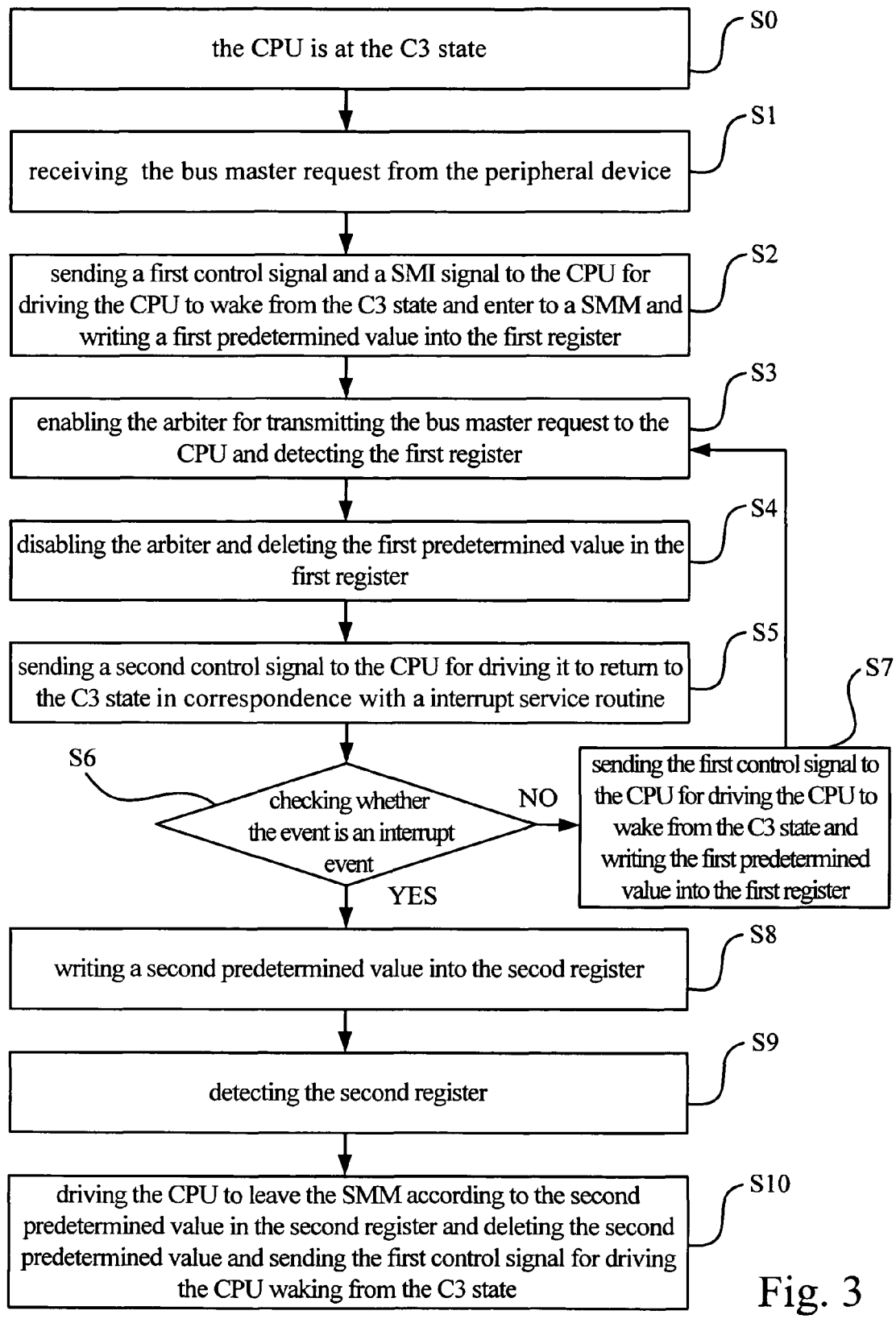
FIG. 3 is a flow chart showing the method for power management of a CPU according to an embodiment of the present invention.

Reference is made to FIG. 3, which is a flow chart showing the method for power management of a CPU according to an embodiment of the present invention. As shown in the step S0, the CPU 10 is at the C3 state and the arbiter 33 of the chip 30 is disabled, as described above. When the chip 30 receives a bus master request from the peripheral device 31, as shown in the step S1, the chip 30 executes step S2, sending a first control signal as well as a System Management Interrupt (SMI) signal to the CPU 10, and writing a first predetermined value into the first register 35 for recording the bus master request.

After receiving the first control signal, the CPU 10 is driven to wake from the C3 state and enter the C0 state, in which the CPU 10 can normally execute instructions. The CPU 10 also enters a System Management Mode (SMM) according to the SMI signal. The reason for the chip 30, according to the present invention, to send the SMI signal is that after waking from the C3 state and entering the C0 state, the CPU 10 is controlled by the operating system of computer in a conventional manner, which prevents the CPU 10 from immediately returning back to the C3 state after processing of the bus master request. Therefore, while sending the first control signal, the chip 30 of the present invention also sends the SMI signal to drive the CPU 10 to enter the SMM and avoid the control of the operating system.

As many trigger events are able to drive the chip 30 to send the SMI signal to the CPU 10 and the CPU 10 to enter into the SMM for processing the relevant events in correspondence with the trigger events respectively, the chip 30 writes the predetermined values into corresponding registers respectively in correspondence with the trigger events when the chip 30 is driven to send the SMI signal to the CPU 10. And after entering the SMM, the CPU 10 evaluates all registers to execute the relevant system management interrupt routine stored in the ROM 40 according to the predetermined values stored in the registers.

Accordingly, the CPU 10 spends time on detecting all registers after entering the SMM. During the time for detection, the chip 30 enables the arbiter 33 for transmitting the bus master request to the CPU 10 for processing. While detecting the first predetermined value recording the bus master request in the first register 35, the CPU 10 of the present invention won't execute the system management interrupt routine until it completes processing the bus master request and the first predetermined value has been deleted by the chip 30.

As described above, when the CPU 10 wakes from the C3 state and enters the C0 state as well as the SMM, the chip 30 executes the step S3, that is, enabling the arbiter 33 to transmit the bus master request from the peripheral device 31 to the CPU 10 and the CPU 10 detecting the first predetermined value. After the CPU 10 completes processing the bus master request, the chip 30 executes the step S4, disabling the arbiter 33 and deleting the first predetermined value in the first register 35. Thus, the CPU 10 will detect that the first predetermined value in the first register 35 has been deleted, which means the processing of the bus master request has been completed.

After that, as shown in the step S5, the CPU 10 executes the system management interrupt routine for driving the chip 30 to send a second control signal to the CPU 10, and the CPU 10 returns to the C3 state according to the second control signal.

Before executing the system management interrupt service routine, the CPU 10 reads the system management interrupt routine from the ROM 40 and stores it in a System Management RAM (SMRAM), wherein the SMRAM is a specific region of the system memory 39.

In accordance with the foregoing description, the system and method of the present invention provides more power-savings than conventional systems and methods, because the CPU 10 does not enter the control of the operating system, but rather the SMM after the CPU 10 enter the C0 state. Thus, the CPU 10 is driven to return to the C3 state immediately after it completes processing the bus master request. On the contrary, CPUs employing conventional technology cannot return to the C3 state immediately after the complete processing of a similar bus master request, because the CPUs are controlled by the operating system, requiring them to take additional time before returning to the C3 state.

After the CPU 10 finishes the step S5, when the peripheral device 31 sends another event, the chip 30 takes the step S6, checking whether the event is an interrupt event. If the event is not an interrupt event, but rather a bus master request, the chip 30 executes the step S7, sending the first control signal to the CPU 10 for driving the CPU 10 to wake from the C3 state, and writing the first predetermined value into the first register 35. The system then repeats the above-mentioned step S3, step S4, and step S5 in sequence.

If the event is an interrupt event, the CPU 10 leaves the SMM and enters a state controlled by the operating system for processing the interrupt event. For this purpose, the chip 30 proceeds to step S8, writing a second predetermined value into the second register 37. Then, as shown in the steps S9 and S10, the CPU 10 detects the second register 37 and leaves the SMM according to the second predetermined value in the second register 37 then enters the state controlled by the operating system. Meanwhile, the chip 30 deletes the second predetermined value in the second register 37. In addition, the chip 30 also sends the first control signal to the CPU 10 to drive the CPU 10 wake from the C3 state and return to the C0 state. Because the CPU 10 returns to the state controlled by the operating system, the operating system drives the chip 30 to enable the arbiter 33 so as to transmit the interrupt event to the CPU 10 for processing.

Although the CPU 10 must leave the SMM, if the event is an interrupt event, according to the present invention, the chip 30 also can drive the CPU 10 directly leaving the SMM and send the first control signal to the CPU 10 for the CPU 10 waking from the C3 state and return to the C0 state without running the steps S8, S9 and S10.

In summary, a method for power management of CPU and a system thereof according to the present invention is applied to a CPU in a non-snooping sleep state, while a peripheral device sends a bus master request. According to the present invention, the CPU wakes from the non-snooping sleep state, enters a normally executing instruction state for processing the bus master request as well as a system management mode for being out of control of the operating system. After completing the processing of the bus master request, the CPU is driven to return to the C3 state according to a system management interrupt routine. Thus, the energy consumed by the CPU is reduced from that of conventional systems. Consequently, the usage time of the batteries in portable computers is extended, thereby extending the useful operating time of the portable computers. In addition, the present invention also reduces the extra power consumption of the CPU in desktop computers.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

The invention claimed is:

1. A method for power management of a central processing unit (CPU) in a non-snooping sleep state, the method comprising:
   in response to a bus master request from a peripheral device, sending a first control signal and a system management interrupt signal to the CPU for driving the CPU to wake from the non-snooping sleep state and enter a normally executing instruction state as well as a system management mode;
   enabling an arbiter for transmitting the bus master request to the CPU for processing; and
   after transmitting the bus master request to the CPU, disabling the arbiter and sending a second control signal to the CPU for driving the CPU return to the non-snooping sleep state according to a system management interrupt routine after the bus master request is processed by the CPU.

2. The method according to claim 1, the step of sending a first control signal and a system management interrupt signal to the CPU, further comprising:
   writing a first predetermined value into a first register for recording the bus master request.

3. The method according to claim 2, the first predetermined value is deleted when the bus master request is processed by the CPU.

4. The method according to claim 3, the system management interrupt routine is executed after the first predetermined value has been deleted.

5. The method according to claim 1, after the CPU returns to the non-snooping sleep state, further comprising:
   driving the CPU to leave the system management mode when the peripheral device sends an interrupt event;
   sending the first control signal to the CPU for driving the CPU wake from the non-snooping sleep state and enter the normally executing instruction state; and
   enabling the arbiter for transmitting the interrupt event to the CPU.

6. The method according to claim 1, after the CPU returns to the non-snooping sleep state, further comprising:
   writing a second predetermined value into a second register when the peripheral device sends an interrupt event;
   detecting the second register by the CPU and leaving the system management mode according to the second predetermined value; and
   deleting the second predetermined value.

7. The method according to claim 1, wherein the system management interrupt routine is stored in a memory.

8. The method according to claim 1, wherein the non-snooping sleep state is a C3 state, and the normally executing instruction state is a C0 state.

9. A power management system for a CPU at a non-snooping sleep state, the power management system electronically connected with a peripheral device which sends a bus master request, comprising:
   a chip, for sending a first control signal and a system management interrupt signal to the CPU for driving the CPU to wake from the non-snooping sleep state and enter a normally executing instruction state as well as a system management mode;
   an arbiter, for transmitting the bus master request to the CPU; and
   a memory, for storing a system management interrupt routine executed by the CPU;
   wherein when the CPU enters the normally executing instruction state, the chip enables the arbiter when the CPU enters a System Management Mode (SMM), and after the CPU completes processing the bus master request, the chip disables the arbiter and sends a second control signal to the CPU for driving the CPU return to the non-snooping sleep state according to the system management interrupt routine.

10. The system according to claim 9, further comprising: a first register, for storing a first predetermined value, wherein when the chip sends the system management interrupt signal, the chip writes the first predetermined value into the first register.

11. The system according to claim 10, wherein the first predetermined value is deleted after the CPU completing processing of the bus master request.

12. The system according to claim 11, wherein the CPU executes the system management interrupt routine to drive the chip to send the second control signal after the first predetermined value has been deleted.

13. The system according to claim 10, wherein the first register is disposed on the chip.

14. The system according to claim 9, wherein after the CPU returns to the non-snooping sleep state, the CPU leaves the system management mode when the peripheral device sends an interrupt event.

15. The system according to claim 14, wherein the chip sends the first control signal to the CPU for driving the CPU wake from the non-snooping sleep state and enter the normal state as well as enables the arbiter to transmit the interrupt event to the CPU.

16. The system according to claim 9, further comprising:
   a second register, for storing a second predetermined value, wherein the second predetermined value is wrote into the second register by the chip when the peripheral device sends an interrupt event after the CPU returns to the non-snooping sleep state.

17. The system according to claim 16, wherein the CPU detects the second register and leaves the system management mode according to the second predetermined value and then deletes the second predetermined value.

18. The system according to claim 16, wherein the second register is disposed on the chip.

19. The system according to claim 9, wherein the arbiter is disposed on the chip.

20. The system according to claim 9, wherein the non-snooping sleep state is a C3 state, and the normally executing instruction state is a C0 state.

* * * * *